US011052758B2

(12) United States Patent
Eschenburg et al.

(10) Patent No.: US 11,052,758 B2
(45) Date of Patent: Jul. 6, 2021

(54) METHOD OF CONTROLLING AN AXLE ASSEMBLY

(71) Applicant: ArvinMeritor Technology, LLC, Troy, MI (US)

(72) Inventors: Dale Eschenburg, Rochester Hills, MI (US); Brian D. Hayes, Newark, OH (US); Robert J. Martin, Harrison Township, MI (US); Phillip Leicht, South Lyon, MI (US); Christopher Keeney, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 554 days.

(21) Appl. No.: 16/059,395

(22) Filed: Aug. 9, 2018

(65) Prior Publication Data

US 2020/0047613 A1 Feb. 13, 2020

(51) Int. Cl.
*F16H 57/04* (2010.01)
*B60K 17/36* (2006.01)
*B60K 17/16* (2006.01)
*B60K 23/08* (2006.01)
*F16H 48/38* (2012.01)
*F16H 57/037* (2012.01)
*F16H 48/08* (2006.01)
(Continued)

(52) U.S. Cl.
CPC ............ *B60K 17/36* (2013.01); *B60K 17/16* (2013.01); *B60K 23/04* (2013.01); *B60K 23/0808* (2013.01); *F16H 48/08* (2013.01); *F16H 48/20* (2013.01); *F16H 48/38* (2013.01); *F16H 57/037* (2013.01); *F16H 57/045* (2013.01); *F16H 57/048* (2013.01); *F16H 57/0457* (2013.01); *F16H 57/0483* (2013.01); *F16H 2048/204* (2013.01); *F16H 2048/385* (2013.01)

(58) Field of Classification Search
CPC ............ F16H 57/0483; F16H 57/0457; F16H 57/0471; F16H 57/045–0454; F16H 48/38; B60K 17/36; B60K 23/0808; B60K 17/3515; B60K 23/08–2023/0875; B60K 17/16
See application file for complete search history.

(56) References Cited

U.S. PATENT DOCUMENTS 2,168,970 A * 8/1939 Buckendale ........... B60K 17/36
180/24.09
2,312,263 A 2/1943 Ormsby
(Continued)

FOREIGN PATENT DOCUMENTS

DE 1430473 A1 10/1968
DE 19805881 C1 6/1999
(Continued)

OTHER PUBLICATIONS

U.S. Appl. No. 15/667,677, filed Aug. 3, 2017.
(Continued)

*Primary Examiner* — Sherry L Estremsky
(74) *Attorney, Agent, or Firm* — Brooks Kushman PC

(57) ABSTRACT

A method of controlling an axle assembly. At least one wheel hub may be operatively connected to a differential assembly having a ring gear when the ring gear does not receive torque from a torque source. Torque from the wheel hub may rotate the ring gear and the ring gear may provide splash lubrication.

20 Claims, 8 Drawing Sheets

(51) Int. Cl.
  *B60K 23/04* (2006.01)
  *F16H 48/20* (2012.01)

(56) References Cited

U.S. PATENT DOCUMENTS

| | | | |
|---|---|---|---|
| 3,199,375 A | 8/1965 | Rosen et al. | |
| 4,263,824 A | 4/1981 | Mueller | |
| 4,914,979 A | 4/1990 | Balmforth | |
| 5,092,188 A | 3/1992 | Fujikawa et al. | |
| 5,989,143 A | 11/1999 | Bell et al. | |
| 8,382,633 B2 | 2/2013 | Cooper et al. | |
| 8,398,520 B1 | 3/2013 | Bassi et al. | |
| 8,523,738 B2 | 9/2013 | Morscheck et al. | |
| 8,562,479 B2 | 10/2013 | Hamperl et al. | |
| 8,651,994 B2 | 2/2014 | Bassi et al. | |
| 8,776,950 B2 * | 7/2014 | Quehenberger | F16H 57/0483 184/6.12 |
| 8,845,473 B2 | 9/2014 | Nett et al. | |
| 8,851,212 B2 | 10/2014 | Kahl | |
| 8,911,321 B2 | 12/2014 | Ziech et al. | |
| 9,020,715 B2 | 4/2015 | Nellums et al. | |
| 9,102,232 B2 | 8/2015 | Ziech et al. | |
| 9,109,635 B2 | 8/2015 | Boothby et al. | |
| 9,121,455 B2 | 9/2015 | Cooper | |
| 9,284,995 B2 | 3/2016 | Lawson et al. | |
| 9,303,754 B2 * | 4/2016 | Nett | F16D 25/12 |
| 9,333,857 B2 | 5/2016 | Morscheck et al. | |
| 9,428,050 B2 | 8/2016 | Ziech et al. | |
| 9,457,655 B2 | 10/2016 | Ziech et al. | |
| 9,457,656 B2 | 10/2016 | Ziech et al. | |
| 9,457,657 B2 | 10/2016 | Ziech et al. | |
| 9,573,464 B2 * | 2/2017 | Yoshimura | B60K 17/35 |
| 9,630,493 B2 * | 4/2017 | Stares | B60K 23/0808 |
| 10,626,979 B2 * | 4/2020 | Hayes | F16N 7/26 |
| 10,864,818 B2 * | 12/2020 | Eschenburg | B60K 17/3462 |
| 10,926,633 B2 * | 2/2021 | Frenznick | B60K 23/0808 |
| 10,962,102 B2 * | 3/2021 | Barillot | F16H 57/0457 |
| 2002/0187870 A1 | 12/2002 | Staheli et al. | |
| 2011/0218715 A1 | 9/2011 | Duraiswamy et al. | |
| 2012/0202640 A1 | 8/2012 | Morimoto | |
| 2013/0085031 A1 | 4/2013 | Bassi et al. | |
| 2014/0141923 A1 | 5/2014 | Forsyth | |
| 2015/0126320 A1 | 5/2015 | Genise et al. | |
| 2015/0247562 A1 | 9/2015 | Valente | |
| 2016/0280066 A1 | 9/2016 | Tavvala et al. | |
| 2016/0363205 A1 | 12/2016 | Tiziani et al. | |
| 2017/0144540 A1 | 5/2017 | Kincaid et al. | |
| 2018/0147939 A1 | 5/2018 | Sharma et al. | |
| 2018/0223983 A1 * | 8/2018 | Tamura | B60K 17/06 |

FOREIGN PATENT DOCUMENTS

| | | |
|---|---|---|
| DE | 102008015200 A1 | 9/2009 |
| DE | 102008002844 A1 | 11/2009 |
| EP | 3163126 A1 | 5/2017 |
| EP | 3473477 A1 | 4/2019 |
| JP | H0999754 A | 4/1997 |
| NO | 2016205480 A1 | 12/2016 |
| WO | 2006004489 A1 | 1/2006 |
| WO | 2011097244 A2 | 8/2011 |

OTHER PUBLICATIONS

U.S. Appl. No. 15/964,780, filed Apr. 27, 2018.
European Patent Office, Extended European Search Report for corresponding European Application No. 19173368.2-1012, dated Oct. 30, 2019.
Dale Eschenburg, et al., U.S. Appl. No. 16/059,226, filed Aug. 9, 2018.
Dale Eschenburg, et al, U.S. Appl. No. 16/190,818, filed with the U.S. Patent and Trademark Office on Nov. 14, 2018.

* cited by examiner

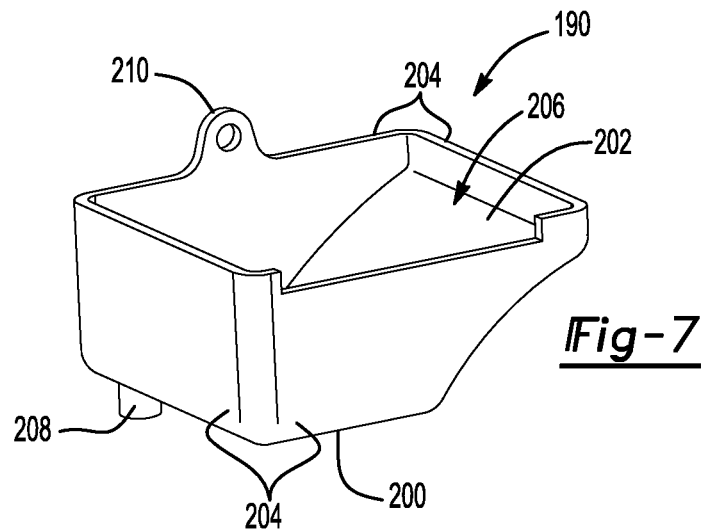
Fig-7
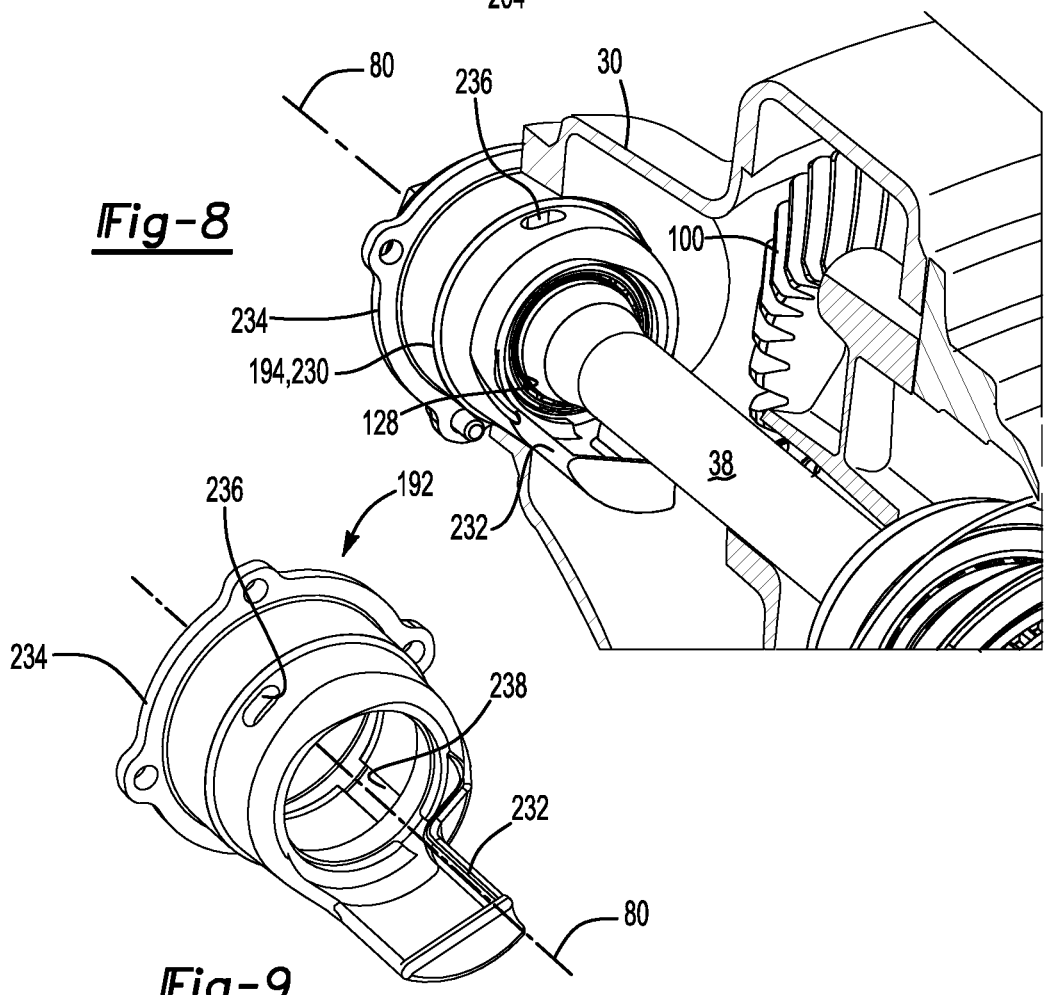
Fig-8
Fig-9

METHOD OF CONTROLLING AN AXLE ASSEMBLY

TECHNICAL FIELD

This disclosure relates to a method of controlling an axle assembly in which a wheel may be selectively connected to a differential assembly to provide splash lubrication.

BACKGROUND

An axle shaft disconnect assembly is disclosed in U.S. Pat. No. 8,382,633.

SUMMARY

In at least one embodiment, a method of controlling an axle assembly is provided. The axle assembly may include a housing assembly, a drive pinion, a differential assembly, and at least one wheel hub. The drive pinion may be selectively connectable to a torque source. The differential assembly may be received in the housing assembly and may have a ring gear that may mesh with a drive pinion. The wheel hub may support a vehicle wheel and may be selectively connected to the differential assembly. The method may include operatively connecting at least one wheel hub to the differential assembly when the ring gear does not receive torque from a torque source such that torque from the wheel hub rotates the ring gear and the ring gear splashes lubricant in the housing assembly.

BRIEF DESCRIPTION OF THE DRAWINGS

FIG. 7 is a perspective view of the lubricant reservoir of FIG. 6.

FIG. 8 is a perspective view of a portion of the axle assembly having an output bearing lubricant reservoir.

FIG. 9 is a perspective view of the output bearing lubricant reservoir of FIG. 8.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
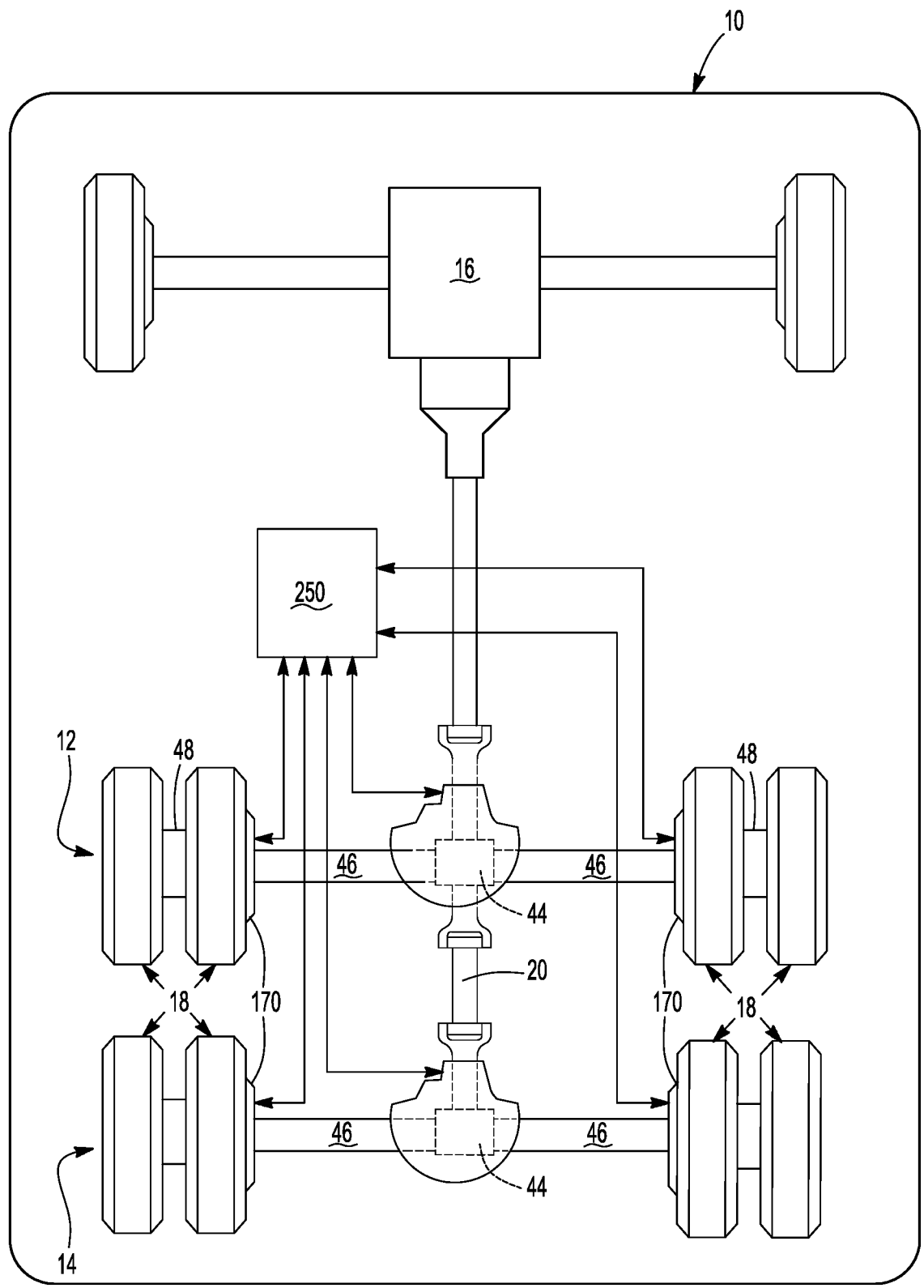
FIG. 1 is a schematic of a vehicle having axle assemblies.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments.

The vehicle 10 may have an axle system that may include a plurality of axle assemblies, such as a first axle assembly 12 and a second axle assembly 14. The first axle assembly 12 and the second axle assembly 14 may be drive axle assemblies. A drive axle assembly may be part of a vehicle drivetrain and may receive torque from at least one torque source 16, such as an engine, electric motor, transmission, transfer case, or another axle assembly. A drive axle assembly may provide torque to one or more wheel assemblies 18, such as a tire disposed on a wheel, that may be rotatably supported on the drive axle assembly.

In FIG. 1, two axle assemblies are shown in a tandem axle configuration, although it is contemplated that a greater number of axle assemblies may be provided. In a tandem configuration, the first axle assembly 12, which may also be referred to as may be referred to as a forward-rear drive axle assembly, may be connected in series with the second axle assembly 14, which may also be referred to as a rear-rear drive axle assembly. The first axle assembly 12 may be operatively connected to the torque source 16 as will be discussed in more detail below. An output of the first axle assembly 12 may be coupled to an input of the second axle assembly 14, such as with a prop shaft 20. The prop shaft 20 may be coupled to the output of the first axle assembly 12 and the input of the second axle assembly 14 at opposing ends via couplings, such as universal joints, that may allow the first axle assembly 12 and the second axle assembly 14 to move with respect to each other while allowing the prop shaft 20 to rotate.

As will be discussed in more detail below, torque may be selectively provided to the wheel assemblies 18 of at least one of the axle assemblies. For example, torque may be provided to the first axle assembly 12 and the second axle assembly 14 and to their associated wheel assemblies 18 to provide sufficient torque to propel the vehicle 10 from a stationary position, when climbing a road grade, or to provide sufficient torque to meet acceleration demands. Torque may not be provided to the wheel assemblies 18 of the first axle assembly 12 or the wheel assemblies 18 of the second axle assembly 14 when torque demands are sufficiently low, such as when the vehicle is at a road cruise speed or when torque from one axle assembly is sufficient to meet propulsion or acceleration demands. Not providing torque to either the first axle assembly 12 or the second axle assembly 14 may help improve axle operating efficiency and fuel economy. Torque may not be provided to the wheel assemblies 18 of an axle assembly by (1) not providing torque from the torque source 16 to the differential assembly of the axle assembly and (2) disconnecting the differential assembly from its associated wheel assemblies 18. The combination of disconnecting a differential assembly from the torque source 16 and from its associated wheel assemblies 18 may allow the differential assembly to remain substantially stationary, which may reduce churning losses due to drag forces exerted by lubricant on the ring gear of the differential assembly and may help improve axle operating efficiency. However, splash lubrication (i.e., lubrication that is based on lubricant that is splashed by moving components of the axle assembly) may be eliminated or substantially reduced when a differential assembly is stationary or rotates a low speed. As a result, sufficient lubricant may not be provided to components of the axle assembly that may continue to move or rotate even when torque is not provided to the wheel assemblies 18. Accordingly, the present invention contemplates that the differential assembly may be occasionally reconnected to its associated wheel assemblies 18 so that the wheel assemblies 18 may "backdrive" or provide torque to rotate the differential assembly and provide splash lubrication when the torque source 16 does not provide torque to the differential assembly.

Figure 2:
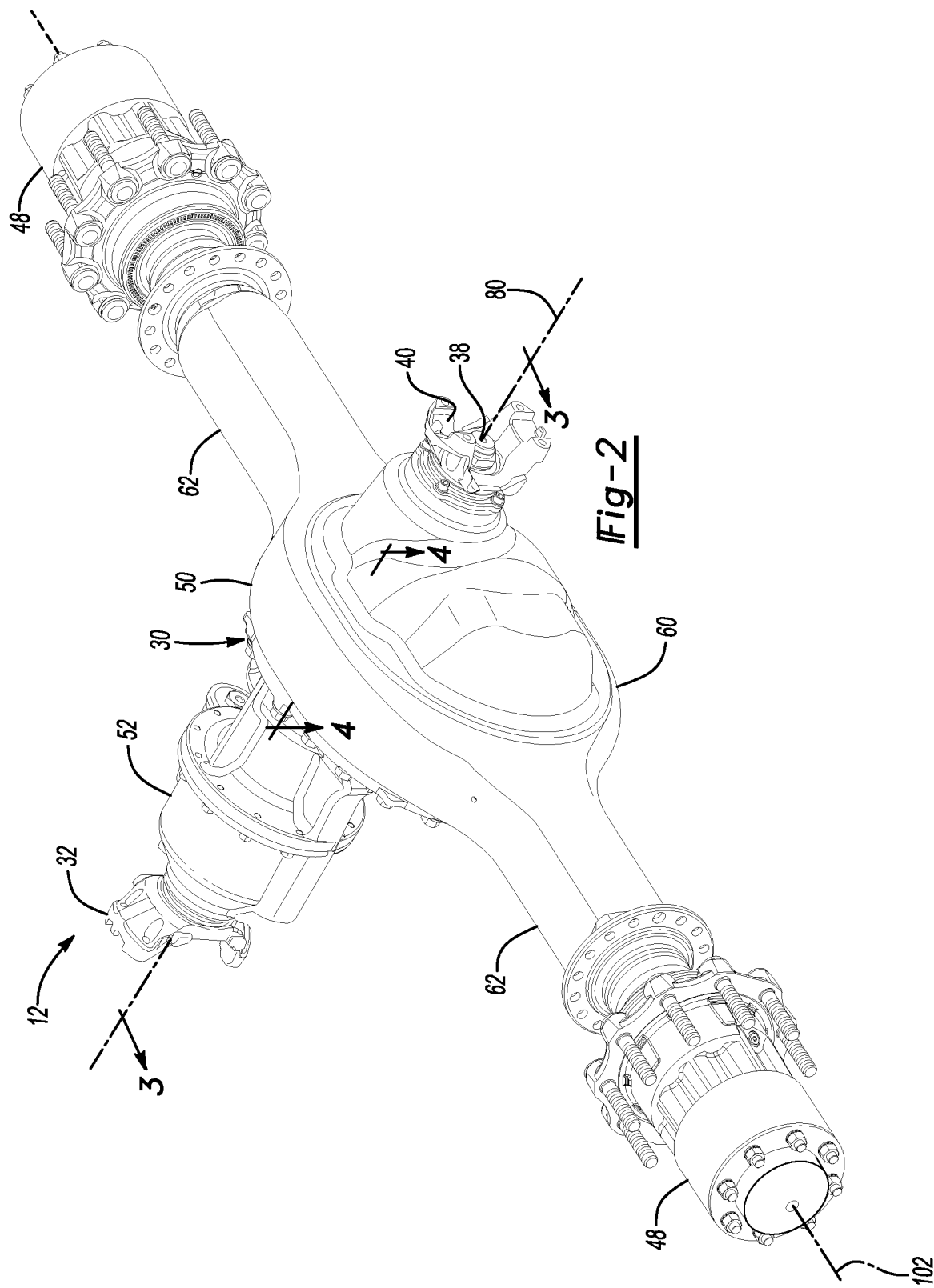
FIG. 2 is a perspective view of an axle assembly having wheel end disconnects.
Figure 3:
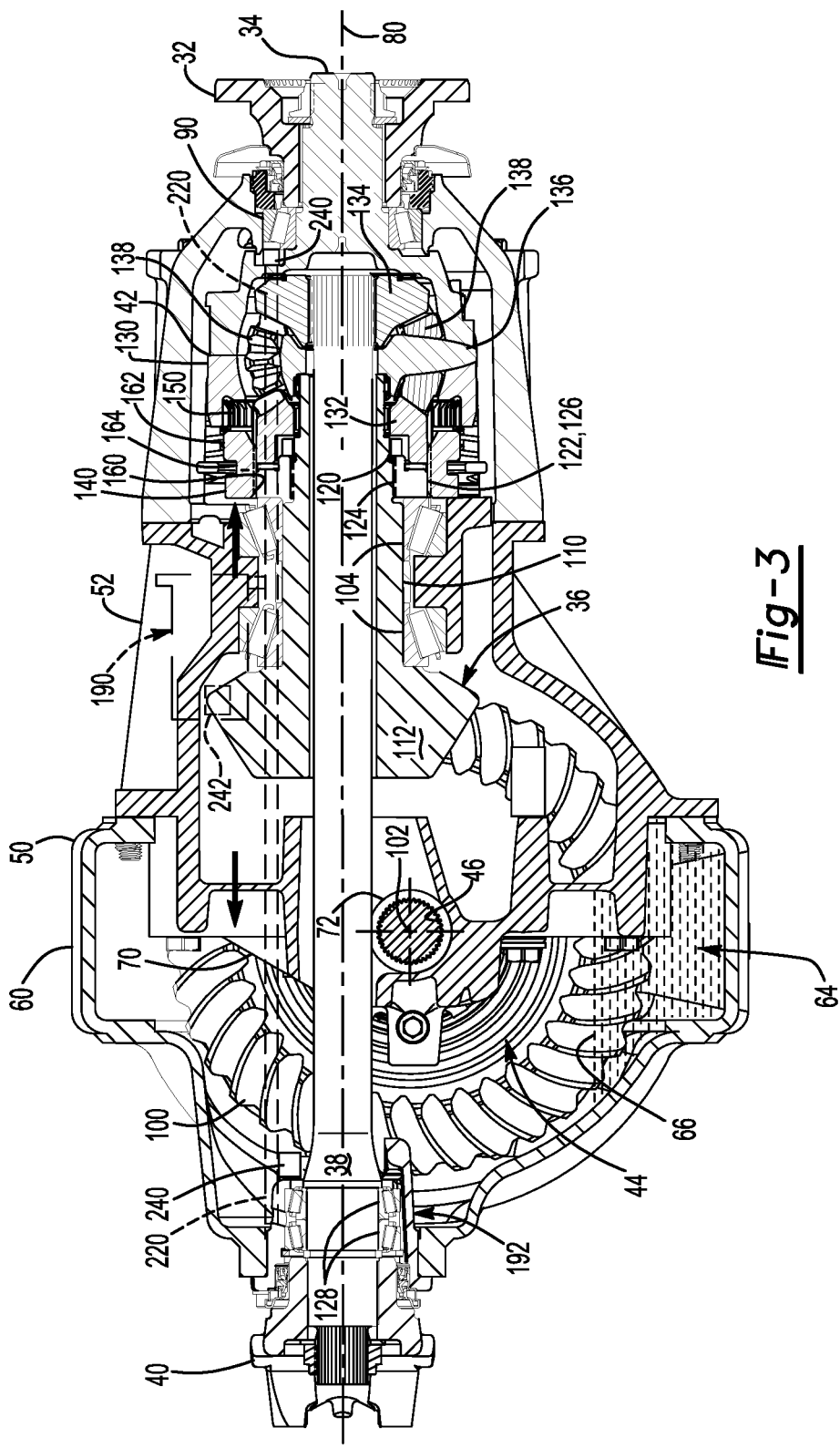
FIG. 3 is a section view of the axle assembly along section line 3-3 with a clutch collar in a first position.

Referring to FIGS. 2 and 3, an example of an axle assembly is shown. The example shown in FIGS. 2 and 3 is primarily referenced below in the context of being the first axle assembly 12; however, it is to be understood that the first axle assembly 12 may be provided in other configurations, such as by adding wheel end disconnects to the axle assembly configurations described in U.S. Pat. No. 8,398,520, which is assigned to the assignee of the present invention and is incorporated by reference in its entirety. FIGS. 2 and 3 illustrate an axle assembly that has a differential assembly that may be disconnectable from the torque source 16 and from its associated wheel assemblies 18; however, it is contemplated that the second axle assembly 14 rather than the first axle assembly 12 may be provided with a differential assembly that may be disconnectable from the torque source 16 and from its associated wheel assemblies 18 in one or more configurations. In the configuration shown in FIGS. 2 and 3, the axle assembly may include a housing assembly 30, an input yoke 32, an input shaft 34, a drive pinion 36, an output shaft 38, an output yoke 40, an interaxle differential unit 42, a differential assembly 44, a pair of axle shafts 46, and a pair of wheel end disconnects 48.

Referring to FIG. 2, the housing assembly 30 may receive various components of the axle assembly. In addition, the housing assembly 30 may facilitate mounting of the axle assembly to the vehicle. The housing assembly 30 may include an axle housing 50 and a differential carrier 52.

The axle housing 50 may receive and support the axle shafts 46. In at least one embodiment, the axle housing 50 may include a center portion 60 and at least one arm portion 62.

The center portion 60 may be disposed proximate the center of the axle housing 50. The center portion 60 may define a cavity that may receive the differential assembly 44. A lower region of the center portion 60 may at least partially define a sump portion 64 that may contain lubricant 66. Splashed lubricant may flow down the sides of the center portion 60 and may flow over internal components of the axle assembly and collect in the sump portion 64.

One or more arm portions 62 may extend from the center portion 60. For example, two arm portions 62 may extend in opposite directions from the center portion 60 and away from the differential assembly 44. The arm portions 62 may have substantially similar configurations. For example, the arm portions 62 may each have a hollow configuration or tubular configuration that may extend around and may receive the corresponding axle shaft 46 and may help separate or isolate the axle shaft 46 from the surrounding environment. An arm portion 62 or a portion thereof may be integrally formed with the center portion 60 or may be separate from the center portion 60.

Referring to FIGS. 2 and 3, the differential carrier 52, which may also be called a carrier housing, may be mounted to the center portion 60 of the axle housing 50. The differential carrier 52 may receive the interaxle differential unit 42 and support components of the differential assembly 44. As is best shown in FIG. 3, the differential carrier 52 may have one or more bearing supports 70.

The bearing support 70 may receive a roller bearing assembly 72 that may rotatably support the differential assembly 44. For example, two bearing supports 70 may be received in the center portion 60 and may be located proximate opposite sides of the differential assembly 44.

The input yoke 32 may facilitate coupling of the first axle assembly 12 to the torque source 16. For example, the input yoke 32 may be coupled to the drive shaft that may be coupled to the torque source 16. The input yoke 32 may be mounted on the input shaft 34 as is best shown in FIG. 3. For example, the input yoke 32 may have an opening that receives the input shaft 34 and may be secured to the input shaft 34 with a fastener such as a nut.

Referring to FIG. 3, the input shaft 34 may extend along and may be configured to rotate about a first axis 80. For example, the input shaft 34 may be rotatably supported at least one roller bearing assembly, which may be referred to as an input bearing 90, that may be disposed on the differential carrier 52. The input shaft 34 may be part of the interaxle differential unit 42 or may be operatively connected to the interaxle differential unit 42. For instance, the input shaft 34 may be integrally formed with a case of the interaxle differential unit 42 or may be provided as a separate component that is fixedly coupled to the case in one or more embodiments.

The drive pinion 36 may provide torque to a ring gear 100 that may be provided with the differential assembly 44. In at least one configuration, the drive pinion 36 may extend along and may be configured to rotate about the first axis 80. Alternatively, the drive pinion 36 may be rotatable about an axis that is disposed below the first axis 80, such as is disclosed in the axle assembly configuration described in U.S. Pat. No. 8,398,520. The ring gear 100 may rotate about a second axis 102. The drive pinion 36 may be rotatably supported by one or more roller bearing assemblies 104 that may be disposed on the differential carrier 52. In at least one configuration, the drive pinion 36 may include a shaft portion 110 and a gear portion 112.

The shaft portion 110 may extend from the interaxle differential unit 42 to the gear portion 112. The shaft portion 110 may include a passage through which the output shaft 38 may extend and a drive pinion spline 120.

The drive pinion spline 120 may be axially disposed between the end of the drive pinion 36 and roller bearing assemblies 104. The drive pinion spline 120 may include a plurality of teeth that may be disposed substantially parallel to the first axis 80 and may mate with a corresponding spline on a connector ring 122. For example, the connector ring 122 may receive the drive pinion 36 and may have an inner spline 124 and an outer spline 126. The inner spline 124 may mate with the drive pinion spline 120. As such, the connector ring 122 may rotate with the drive pinion 36. The outer spline 126 may be disposed opposite the inner spline 124. The outer spline 126 may mate with a corresponding spline on a clutch collar as will be described in more detail below.

The gear portion 112 may be disposed at an end of the shaft portion 110. The gear portion 112 may have a plurality of teeth that may mate or mesh with corresponding teeth on the ring gear 100.

The output shaft 38 may extend along and may be configured to rotate about the first axis 80. For instance, the output shaft 38 may be supported by one or more roller bearings that may be disposed on the housing assembly 30, such as one or more output bearings 128 that may be disposed at an opposite end of the housing assembly 30 from the input bearing 90. The output shaft 38 may extend through the drive pinion 36 and may extend through a spider of the interaxle differential unit 42 as will be discussed in more detail below. The output shaft 38 may be coupled to the interaxle differential unit 42 at a first end. For example, the output shaft 38 may be fixedly coupled to a second side gear of the interaxle differential unit 42. The output shaft 38 may be fixedly coupled to the output yoke 40 at a second end that may be disposed opposite the first end.

Referring to FIGS. 2 and 3, the output yoke 40 may facilitate coupling of the output shaft 38 to the second axle assembly 14. For example, the output yoke 40 may be coupled to a connecting shaft, such as the prop shaft 20. The output yoke 40 may be mounted on the output shaft 38. For instance, the output yoke 40 may have an opening that receives the output shaft 38 may be secured to the output shaft 38 with a fastener like a nut.

Referring to FIG. 3, the interaxle differential unit 42 may operatively connect the input shaft 34 to the drive pinion 36 and/or the output shaft 38. The interaxle differential unit 42 may compensate for speed differences between different drive axle assemblies, such as speed differences between the first axle assembly 12 and a second axle assembly 14. In at least one configuration, the interaxle differential unit 42 may include a case 130, a first side gear 132, a second side gear 134, a spider 136, and a plurality of pinion gears 138, and a clutch collar 140.

The case 130 may be configured to receive components of the interaxle differential unit 42. In addition, the case 130 may be rotatable about the first axis 80. The input shaft 34 may be integrally formed with the case 130 in one or more configurations. The case 130 may include a plurality of holes that may retain the spider 136 and may include a case gear 150.

The case gear 150 may face toward the clutch collar 140 and may be selectively engaged by the clutch collar 140. The case gear 150 may include a plurality of teeth that may be arranged around the first axis 80. The case gear 150 may be configured as a face gear, in which the teeth extend axially toward the clutch collar 140, or may be configured as a spline or set of teeth that may be arranged around the clutch collar 140 and that may extend radially inward toward the clutch collar 140 and the first axis 80.

The first side gear 132 may be rotatably disposed on the drive pinion 36. For example, the first side gear 132 may be disposed around the first axis 80 and may have a center bore that may receive the shaft portion 110 of the drive pinion 36. A roller bearing assembly may be disposed between the shaft portion 110 and the first side gear 132 to permit the first side gear 132 to rotate with respect to the drive pinion 36 depending on the position of the clutch collar.

The second side gear 134 may be disposed on the output shaft 38. For example, the second side gear 134 may be disposed around the first axis 80 and may have a center bore that may receive the output shaft 38. The center bore may include a spline that may receive and engage a corresponding spline on the output shaft 38. As such, the second side gear 134 may not rotate about the first axis 80 with respect to the output shaft 38.

The spider 136 may be fixedly positioned with respect to the case 130 and may be rotatably disposed on the drive pinion 36 or may be rotatable with respect to the drive pinion 36. The spider may include one or more spider shafts that may rotatably support corresponding pinion gears 138.

A pinion gear 138 may be rotatably disposed on a corresponding spider shaft. Each pinion gear 138 may have teeth that may mesh with teeth on the first side gear 132 and the second side gear 134.

The clutch collar 140, which may also be referred to as a lock collar, may be moveably disposed on the connector ring 122. The clutch collar 140 may move axially or move along the first axis 80 between a first position and a second position as will be discussed in more detail below. The clutch collar 140 may be generally ring-shaped and may include a clutch collar hole 160, a clutch collar gear 162, and a clutch collar groove 164.

The clutch collar hole 160 may extend through the clutch collar 140 and extend around the first axis 80. The clutch collar hole 160 may receive the connector ring 122 and the first side gear 132. For example, the clutch collar 140 may have a spline that may extend into the clutch collar hole 160 and toward the first axis 80 and may mate with the outer spline 126 of the connector ring 122 and a corresponding spline on the first side gear 132. As such, the mating splines may allow the clutch collar 140 to move in an axial direction or along the first axis 80 while inhibiting rotation of the clutch collar 140 about the first axis 80 with respect to the connector ring 122 and the first side gear 132.

The clutch collar gear 162 may include a set of teeth. The set of teeth may be arranged around the first axis 80 and may selectively engage the teeth of the case gear 150 of the case 130 depending on the axial position of the clutch collar 140.

Figure 4:
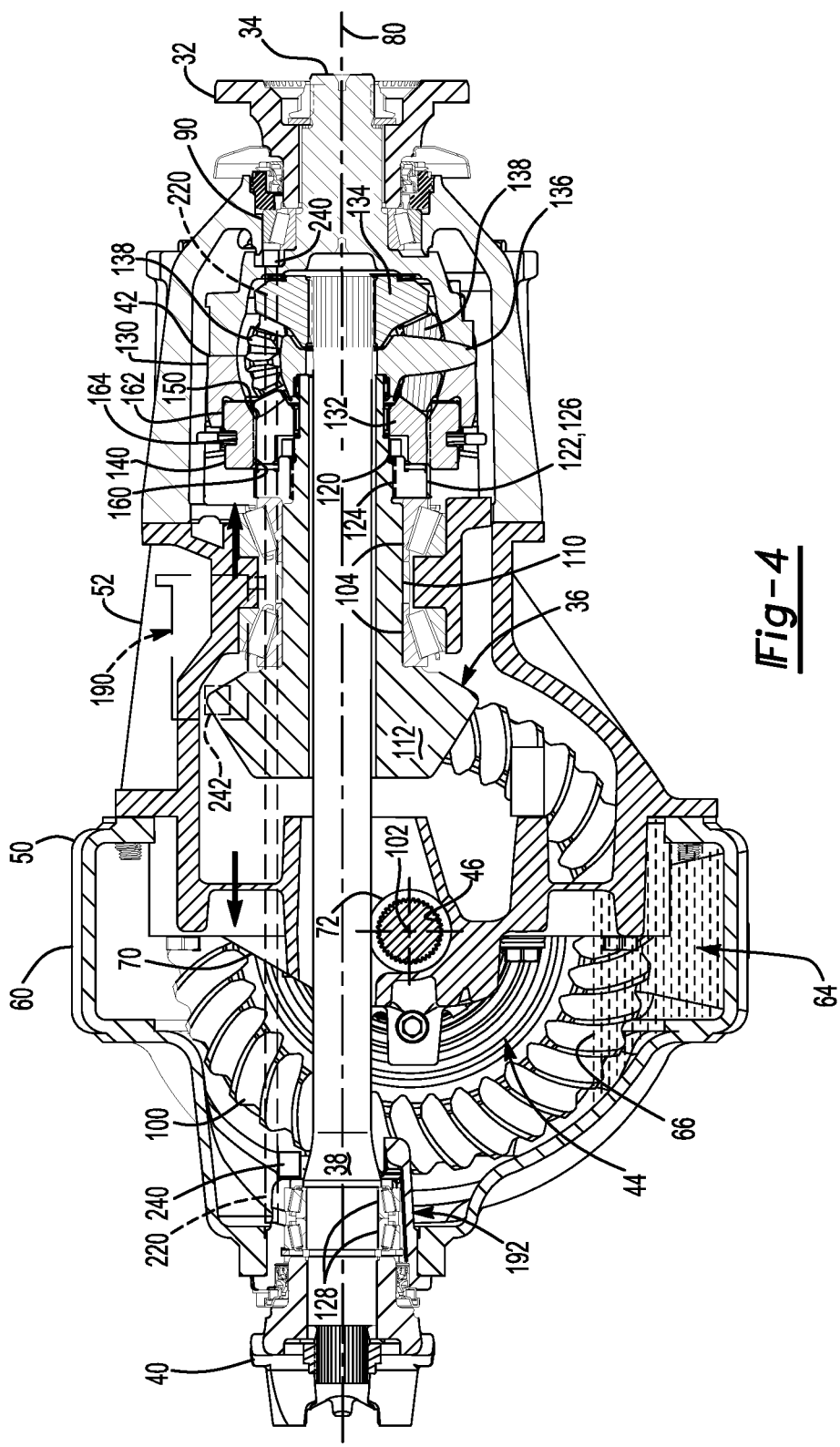
FIG. 4 is a section view of the axle assembly with the clutch collar in a second position.

The clutch collar groove 164 may face away from the first axis 80 and may extend around the first axis 80. The clutch collar groove 164 may receive a linkage, such as a shift fork, that may operatively connect the clutch collar 140 to an actuator. The actuator may move the clutch collar 140 between a first position and a second position. The clutch collar 140 is shown in the first position in FIG. 3. The clutch collar gear 162 may be spaced apart from and may not mesh with the case gear 150 when the clutch collar 140 is in the first position. As such, the first side gear 132 and drive pinion 36 may be permitted to rotate with respect to the case 130 and may rotate together about the first axis 80. Moreover, torque may be transmitted from the interaxle differential unit 42 to the drive pinion 36 by the first side gear 132 and the connector ring 122 when the clutch collar 140 is in the first position. The clutch collar gear 162 may engage and mesh with the case gear 150 when the clutch collar 140 is in the second position, which is shown in FIG. 4, thereby inhibiting the first side gear 132 from rotating with respect to the case 130. In addition, torque may not be transmitted from the interaxle differential unit 42 to the drive pinion 36 when the clutch collar 140 is in the second position due to the bearing that is disposed between the first side gear 132 and the drive pinion 36.

It is also contemplated that the clutch collar may be provided with a drive pinion that is disposed below the first axis 80, such as is disclosed in the axle assembly configuration described in U.S. Pat. No. 8,398,520.

Referring to FIG. 2, the differential assembly 44 may be disposed in the center portion 60 of the housing assembly 30. The differential assembly 44 may transmit torque to the wheel assemblies 18 and permit the wheel assemblies 18 of the axle assembly to rotate at different velocities. An abbreviated discussion of the operation of the differential assembly 44 follows.

The input yoke 32 may receive torque from the torque source 16. The input yoke 32 may be operatively connected to the input shaft 34, which in turn may be operatively connected to the interaxle differential unit 42. Torque may be transmitted from the interaxle differential unit 42 to the drive pinion 36 when the clutch collar 140 is in the first position. The drive pinion 36 may then provide torque to the ring gear 100 of the differential assembly 44. The differential assembly 44 may be operatively connected to the axle shafts 46 and may permit the axle shaft 46 to rotate at different rotational speeds in a manner known by those skilled in the art. As such, the differential assembly 44 may receive torque via the ring gear 100 and provide torque to the axle shafts 46, provided that the wheel end disconnects are connected. Torque may also be transmitted from the interaxle differential unit 42 to the output shaft 38 when the clutch collar 140 is in the first position.

Torque may also be transmitted from the interaxle differential unit 42 to the output shaft 38 when the clutch collar 140 is in the second position. However, torque from the torque source 16 may not be transmitted from the interaxle differential unit 42 to the drive pinion 36 when the clutch collar 140 is in the second position since the clutch collar 140 is not positioned to inhibit rotation of the first side gear 132 with respect to the connector ring 122.

Referring to FIGS. 1 and 2, the axle shafts 46 may be configured to transmit torque from the differential assembly 44 to corresponding wheel assemblies 18. For example, two axle shafts 46 may be provided such that each axle shaft 46 extends through a different arm portion 62 of axle housing 50. The axle shafts 46 may extend along and may be rotatable about the second axis 102 by the differential assembly 44. Each axle shaft 46 may be operatively connected to a wheel end disconnect 48.

Referring to FIG. 1, a pair of wheel end disconnects 48 may be provided with the axle assembly. For example, a wheel end disconnect 48 may be associated with each axle shaft 46. The wheel end disconnect 48 may selectively connect the differential assembly 44 to a corresponding wheel hub 170 that may be rotatable about the second axis 102 and that may support and facilitate mounting of a wheel assembly 18. The wheel end disconnect 48 may be provided in various locations. For instance, the wheel end disconnect 48 may be provided with the differential assembly or located adjacent to the differential assembly 44 and an end of a corresponding axle shaft 46. As another option, the wheel end disconnect 48 may be disposed at an intermediate location that may be disposed between the differential assembly 44 and the wheel hub 170 and may be spaced apart from the differential assembly 44 and the wheel hub 170, such as is disclosed in U.S. Pat. No. 8,651,994, the disclosure of which is hereby incorporated by reference in its entirety. As another option, the wheel end disconnect 48 may be disposed adjacent to the wheel hub 170 or inside the wheel hub 170, as is disclosed in inside the wheel hub 170, U.S. patent application Ser. Nos. 15/667,677 and 15/964,780, the disclosures of which are hereby incorporated by reference in their entirety.

Referring to FIG. 3, one or more lubricant reservoirs may be provided in the housing assembly 30. A lubricant reservoir may receive, catch, or capture lubricant that is splashed by rotating components of the axle assembly, such as the ring gear 100. The lubricant reservoirs may be disposed above the sump portion 64 of the axle housing 50. In FIG. 3, two lubricant reservoirs are shown. These lubricant reservoirs may be referred to as an upper lubricant reservoir 190 and an output bearing lubricant reservoir 192.

Referring to FIGS. 3-7, the upper lubricant reservoir 190 may be disposed above the first axis 80. In addition, the upper lubricant reservoir 190 may be received inside the differential carrier 52. The upper lubricant reservoir 190 may be disposed adjacent to the ring gear 100 and the drive pinion 36. Moreover, the upper lubricant reservoir 190 may be disposed above the ring gear 100 and the drive pinion 36. In at least one configuration, the upper lubricant reservoir 190 may include a bottom wall 200, and arcuate wall 202, a plurality of side walls 204, an opening 206, an outlet 208, and a mounting feature 210.

Figure 5:
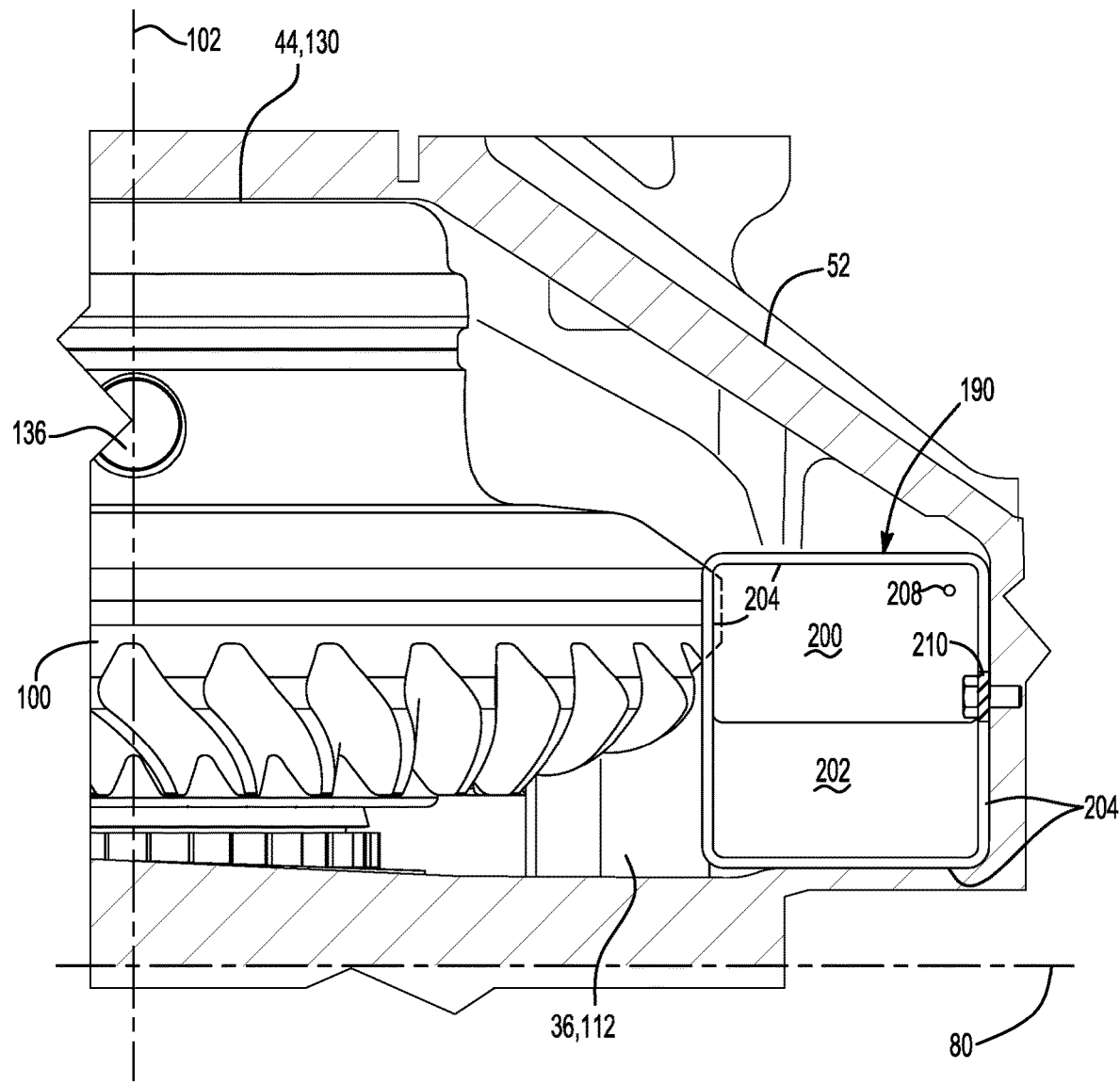
FIG. 5 is a fragmentary section view of the axle assembly along above the first axis and above a majority of an upper lubricant reservoir.
Figure 6:
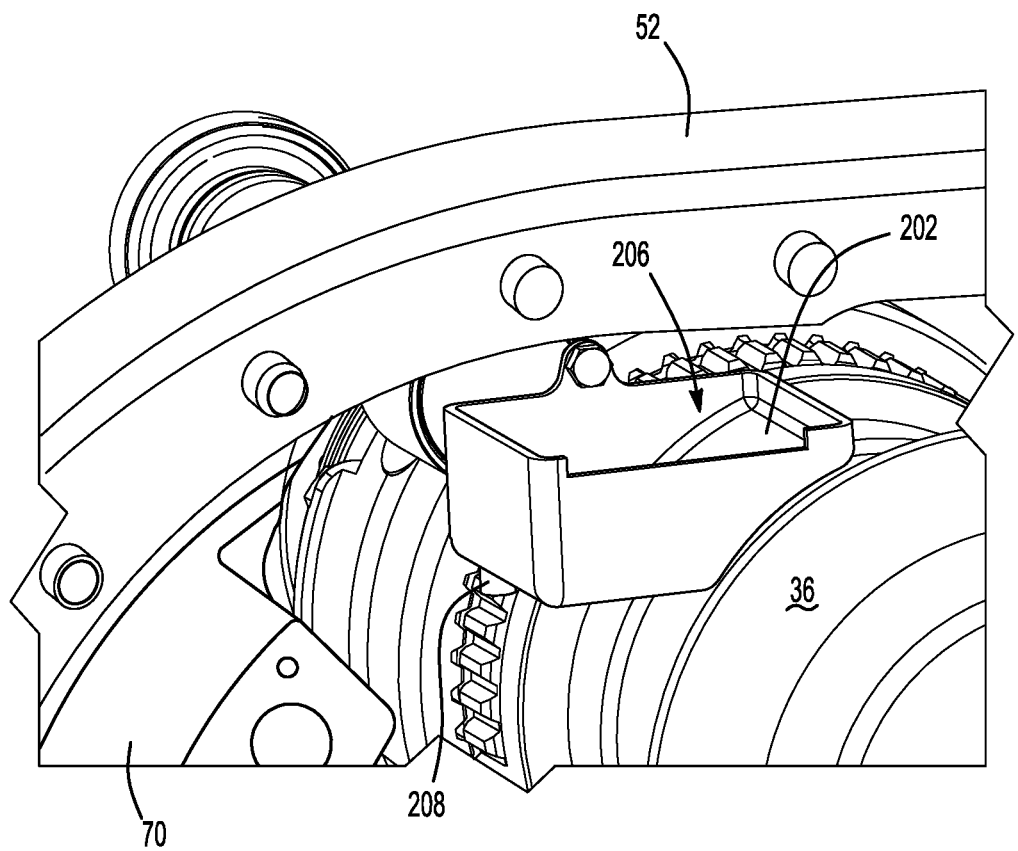
FIG. 6 is a perspective view of a portion of the axle assembly having a lubricant reservoir.

The bottom wall 200 may be disposed at the bottom of the upper lubricant reservoir 190. As is best shown in FIG. 5, the bottom wall 200 may be disposed above the ring gear 100 and the drive pinion 36. For example, the bottom wall 200 may be generally disposed above where the drive pinion 36 meshes with the ring gear 100. In at least one configuration, the bottom wall 200 may be substantially planar.

The arcuate wall 202 may extend from an end of the bottom wall 200. The arcuate wall 202 may extend along an arc that may extend in an upward direction from the bottom wall 200 such that the arcuate wall 202 extends over and is spaced apart from the drive pinion 36.

A plurality of side walls 204 may extend upward from a perimeter defined by the bottom wall 200 and the arcuate wall 202. Each side wall 204 may extend from the end of two other side walls 204 in an end-to-end relationship. The side walls 204 may cooperate to define the opening 206 and may cooperate with the bottom wall 200 and the arcuate wall 202 to retain lubricant in the upper lubricant reservoir 190. Splashed lubricant may enter the upper lubricant reservoir 190 via the opening 206.

The outlet 208 may be a hole that may extend through a wall, such as the bottom wall 200. The outlet 208 may allow lubricant to drain from the upper lubricant reservoir 190. The outlet 208 may be fluidly connected to one or more conduits 220, such as a channel, hose, tube, or the like. In the configuration shown in FIG. 3, a first conduit 220 and a second conduit 220 are fluidly connected to the outlet 208. The first conduit 220 may extend from the outlet 208 toward the input bearing 90. Lubricant that exits the first conduit 220 may be provided to the input bearing 90. The second conduit 220 may extend from the outlet 208 toward the output bearing 128. Lubricant that exits the second conduit 220 may be provided to one or more output bearings 128. It is noted that the conduits 220 are not shown in FIGS. 5 and 6 for clarity.

The mounting feature 210 may facilitate mounting of the upper lubricant reservoir 190 to the housing assembly 30. The mounting feature 210 may have any suitable configuration. In the configuration that is shown in FIG. 7, the mounting feature 210 is configured as a flange that may extend from a side wall 204 and that has a hole that may receive a fastener, such as a screw or bolt, that may couple the upper lubricant reservoir 190 to a portion of the housing assembly 30, such as the differential carrier 52.

Referring to FIGS. 3, 8 and 9, the output bearing lubricant reservoir 192 may be mounted to the housing assembly 30 near an end of the output shaft 38. In at least one configuration, the output bearing lubricant reservoir 192 may include an annular body 230 and a pan 232.

The annular body 230 may extend around the first axis 80. The annular body 230 may define a hole that may receive the output bearings 128. In addition, the annular body 230 may include a flange portion 234, an inlet hole 236, and a groove 238.

The flange portion 234 may extend radially outward from an end of the annular body 230. The flange portion 234 may inhibit axial movement of the output bearing lubricant reservoir 192. For example, the flange portion 234 may engage an end of the housing assembly 30 and may inhibit axial movement of the output bearing lubricant reservoir 192 toward the input shaft 34. In addition, the flange portion 234 may include openings that may receive fasteners, such as bolts, that may secure the output bearing lubricant reservoir 192 to the housing assembly 30.

The inlet hole 236 may be a through hole that may extend through the annular body 230. The inlet hole 236 may receive lubricant from the second conduit 220. The inlet hole 236 may be axially positioned between a pair of output bearings 128 and may be positioned above the first axis 80. As such, lubricant that enters the annular body 230 via the inlet hole 236 may be distributed to both output bearings 128.

The groove 238 may be disposed in the annular body 230. The groove 238 may extend in an axial direction and may help route lubricant between the output bearings 128 and the pan 232.

The pan 232 may extend from an end of the annular body 230 that may be disposed opposite the flange portion 234. The pan may be disposed below the first axis 80 and may extend away from the flange portion 234. The pan 232 may be configured to hold a volume of lubricant. The pan 232 may catch lubricant that drips from the output shaft 38 or is splashed in the housing assembly 30. It is also contemplated that the pan 232 may receive lubricant from a conduit 220.

Referring to FIG. 3, one or more bearing temperature sensors 240 may be configured to detect the temperature of a bearing of the axle assembly. For example, a bearing temperature sensor 240 may detect the temperature of the input bearing 90, output bearing 128, or a bearing that is associated with the interaxle differential unit 42. A bearing temperature sensor 240 may be of any suitable type and may be disposed in close proximity to a bearing to help provide accurate temperature measurements.

The lubricant level sensor 242 may be configured to detect the amount of lubricant or level of lubricant in a lubricant reservoir. For example, a lubricant level sensor 242 may be provided with a lubricant reservoir, such as the upper lubricant reservoir 190 or optionally the output bearing lubricant reservoir 192. Lubricant level sensor 242 may be of any suitable type.

Referring to FIG. 1, a control system 250 may monitor and control operation of the axle system. The control system 250 may include one or more electronic controllers or control modules that may monitor and/or control various components of the axle system. For example, the control system 250 may be configured to control actuation of the clutch collar 140 to operatively connect the drive pinion 36 to the torque source 16 such that torque may be transmitted from the torque source 16 to the differential assembly 44 and to operatively disconnect the drive pinion 36 from the torque source 16 such that torque may not be transmitted from the torque source 16 to the differential assembly 44. The control system 250 may also control actuation or operation of the wheel end disconnects 48 to connect or disconnect the differential assembly 44 from a corresponding wheel hub 170 to permit or prevent the transmission of torque between the differential assembly 44 and the wheel hub 170. In addition, the control system 250 may be configured to receive data from one or more sensors, such as one or more bearing temperature sensors 240, the lubricant level sensor 242, or both. In FIG. 1, communication between the control system 250 and these components is represented by the double arrowed lines that is located adjacent to the control system 250.

Figure 10:
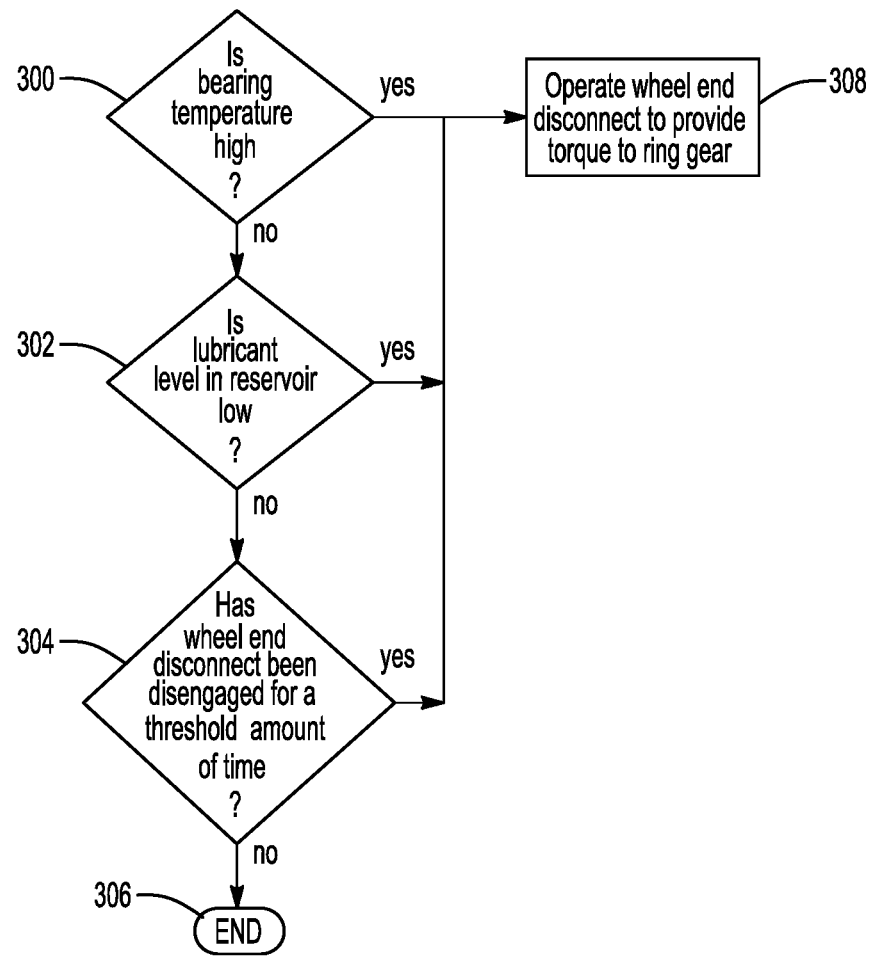
FIG. 10 is a flowchart of a method of controlling the axle assembly.

Referring to FIG. 10, a flowchart of an exemplary method of control of axle system is shown. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope intended.

In at least one embodiment, the method may be executed by the control system 250 and may be implemented as a closed loop control system. Moreover, the method may be enabled or disabled based on the operating state of the vehicle. For example, the method or control logic may be enabled when the vehicle is turned on, the torque source 16 is operational, when the vehicle is in motion, or combinations thereof. In addition, the method may be manually activated.

The method will be primarily described in the context of operating the first axle assembly 12, but it is to be understood that the method may be applied to operate any suitable axle assembly of the axle system.

As an overview, the method may selectively provide torque from a wheel assembly 18 to the differential assembly 44 when torque is not provided to the differential assembly 44 by the torque source 16. Torque that is provided from a wheel assembly 18 to the differential assembly 44 may rotate the differential assembly 44 and its ring gear 100. The ring gear 100 may then splash lubricant that has collected in the sump portion 64 of the axle housing 50. Some of the splashed lubricant may be collected and routed to various components of the axle assembly. For example, lubricant may be collected and routed to components of the axle assembly that may rotate when torque is not transmitted from the torque source 16 to the drive pinion 36, such as the input bearing 90, the output bearing 128, bearings associated with the interaxle differential unit 42, or combinations thereof. As such, lubricant may be routed to components of the axle assembly when the drive pinion 36 does not provide torque to the ring gear 100 without the use of a lubricant pump, such as an electric lubricant pump that may be provided in the axle assembly, which may help reduce cost, weight, and complexity.

The method will be described with respect to the axle system shown in FIG. 1; however, it is to be understood that the method may be employed with other axle systems and axle assembly configurations. The method will be described beginning with the first axle assembly 12 configured such that torque is not provided from the torque source 16 to the drive pinion 36 of the first axle assembly 12 and with the wheel end disconnects 48 of the first axle assembly 12 in a disconnected condition in which torque is not transmitted between the differential assembly 44 and the wheel assemblies 18 and wheel hubs 170 of the first axle assembly 12. As such, the differential assembly 44 and its ring gear 100 may not rotate about the second axis 102, but torque may still be transmitted from the torque source 16 to the second axle assembly 14 via the interaxle differential unit 42 and the output shaft 38.

At block 300, the method may determine whether the temperature of one or more bearings is too high. The temperature of a bearing may be provided by a corresponding bearing temperature sensor 240. The temperature of a bearing may be compared to a threshold temperature. The threshold temperature may be a predetermined temperature at which it may be desirable to provide additional lubricant to the bearing to lubricate and cool the bearing. The threshold temperature may be a predetermined temperature that may be based on vehicle development testing and may be based on the temperature limitations specified by the bearing manufacturer. As one nonlimiting example, the threshold temperature may be 93° C. (200° F.). If the temperature of one or more bearings does not exceed the threshold temperature, then the method may continue at block 302. If the temperature of one or more bearings is greater than a threshold temperature, then the method may continue at block 308.

At block 302, the method may determine whether the level of lubricant in a lubricant reservoir is low. The level of lubricant in a lubricant reservoir may be based on the signal or data that is provided by a corresponding lubricant level sensor 242. The level of lubricant may be compared to a threshold lubricant level. The threshold lubricant level may be a predetermined fill level or volume of lubricant that is in a corresponding lubricant reservoir at which the lubricant reservoir may not be able to provide sufficient lubricant to one or more bearings to satisfy lubricant requirements or operational conditions. The threshold lubricant level may be a predetermined value that may be based on design requirements or vehicle development testing. If the level of lubricant in a lubricant reservoir is not less than the threshold lubricant level, then the lubricant reservoir may be able to provide sufficient lubricant and the method may continue at block 304. If the level of lubricant in a lubricant reservoir is less than the threshold lubricant level, then the lubricant reservoir may not be able to provide sufficient lubricant and the method may continue at block 308.

At block 304, the method may determine whether a wheel end disconnect 48 has been disengaged for a predetermined period of time. The amount of time that the wheel end disconnect 48 has been disengaged may be measured with a timer or counter. For example, a timer may be started when the wheel end disconnects 48 are disconnected and torque is not transmitted from the torque source 16 to the drive pinion 36 and may run and measure the period of time during which the wheel end disconnects 48 remain disconnected. As a result, the timer may measure the amount of time or elapsed time during which the ring gear 100 is not rotated or the amount of time over which meaningful splash lubrication may not be provided. The elapsed time may be compared to a threshold amount of time. The threshold amount of time may be a predetermined amount of time at which providing additional lubricant to a bearing may be desired. The threshold amount of time may be a predetermined value that may be based on design requirements or vehicle development testing. As one nonlimiting example, the threshold amount of time may be approximately 15 minutes; however, it is contemplated that the threshold amount of time may greater than or less than the 10 minutes. If the elapsed time is less than the threshold amount of time, then the method or iteration of the method may and at block 306. If the elapsed time is not less than the threshold amount of time, then the method may continue at block 308.

At block 308, a wheel end disconnect 48 may be actuated to a connected position in which torque is transmitted from a corresponding wheel assembly 18 to the differential assembly 44. For example, the wheel end disconnect 48 may be actuated to operatively connect the wheel hub 170 that is associated with the wheel end disconnect 48 to the differential assembly 44. In the configuration disclosed in U.S. Pat. No. 8,651,994, a coupling may be actuated to couple a wheel axle output shaft that extends from a differential assembly 44 to a corresponding wheel axle. As another example which is disclosed in U.S. patent application Ser. No. 15/667,677, first and second clutches may be moved from an open condition to a gear reduction condition or an intermediate condition. As another example which is disclosed in U.S. patent application Ser. No. 15/964,780, a friction clutch may move from a disengaged position to an engaged position to substantially synchronize the rotational velocity of a wheel hub and a corresponding axle shaft, then a locking clutch may move to a locked position to further facilitate the transmission of torque between the wheel hub and its corresponding axle shaft. Moreover, both wheel end disconnects 48 may be actuated to their respective connected positions so that torque that is provided by at least one rotating wheel assembly 18 may rotate the case 130 of the differential assembly 44 and the ring gear 100 rather than merely spin the internal gears of the differential assembly 44 without rotating the case 130 and the ring gear 100.

Rotation of the ring gear 100 may splash lubricant that has collected in the sump portion 64 of the axle housing 50. Splashed lubricant may be splashed directly to rotating components of the axle assembly, such as the input bearing 90, output bearing 128, or bearings associated with the interaxle differential unit 42. Alternatively or in addition, splashed lubricant may be collected by a lubricant reservoir, such as the upper lubricant reservoir 190, the output bearing lubricant reservoir 192, or both, to help collect a greater volume of lubricant and to route such lubricant more precisely to one or more bearings.

A wheel end disconnect 48 may be subsequently operated to disconnect a wheel assembly 18 from the differential assembly 44 when sufficient splash lubrication has been provided. For instance, a wheel end disconnect 48 may be actuated to a disconnected position in which torque is not transmitted from a corresponding wheel assembly 18 to the differential assembly 44. Actuation of the wheel end disconnects 48 to their respective disconnected positions may be based on one or more parameters. For example, a wheel end disconnect 48 may be actuated to a disconnected position such that a corresponding wheel hub 170 is decoupled from the differential assembly 44 based on attributes such as temperature, time, lubricant levels, or combinations thereof. For example, at least one wheel end disconnect 48 may be disconnected when the temperature of one or more bearings does not exceed the threshold temperature, the level of lubricant in one or more lubricant reservoirs is not less than the threshold lubricant level, or a predetermined period of time has elapsed. The predetermined period of time may be based on design requirements and vehicle development testing. As one nonlimiting example, the predetermined period of time may be approximately 3 minutes; however, it is contemplated that the predetermined period of time may be greater than or less than the 3 minutes.

A wheel end disconnect 48 may not be actuated to its disconnected position (i.e., the wheel end disconnect may remain connected) when torque is to be provided from the torque source 16 to the drive pinion 36 of that axle assembly. For example, the wheel end disconnect 48 may remain connected when torque demand increases and the torque source 16 may be reconnected to the drive pinion 36 so that torque may be transmitted from the torque source 16 to the drive pinion 36 and ultimately to the wheel assemblies 18.

The method may employ blocks 300, 302, and 304 separately or in various combinations. For example, the method may employ block 300, block 302, or block 304 rather than all three blocks. As additional examples, the method may combine multiple blocks. For instance, a wheel end disconnect may be actuated to a connected position in which torque is transmitted from a corresponding wheel to the differential assembly when combinations of blocks 300, 302, and 304 are satisfied, such as when the temperature of a bearing is high and the level of lubricant in a lubricant reservoir is low (thereby combining blocks 300 and 302), when the level of lubricant in a lubricant reservoir is low and a wheel end disconnect has been disengaged for a threshold amount of time (combining blocks 302 and 304), and so on.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling an axle assembly, comprising:
providing the axle assembly that includes a housing assembly, a drive pinion that is selectively connectable to a torque source, and a differential assembly that is received in the housing assembly and has a ring gear that meshes with the drive pinion, wherein the differential assembly is selectively connected to a wheel hub that supports a wheel; and
operatively connecting the wheel hub to the differential assembly when the ring gear does not receive torque from the torque source such that torque from the wheel hub rotates the ring gear and the ring gear splashes lubricant in the housing assembly.

2. The method of claim 1 wherein the wheel hub is coupled to the differential assembly when a temperature of a bearing that is located inside the housing assembly exceeds a threshold temperature.

3. The method of claim 2 wherein the wheel hub is subsequently decoupled from the differential assembly when the temperature of the bearing does not exceed the threshold temperature.

4. The method of claim 2 wherein the bearing is an input bearing that rotatably supports an input shaft that is operatively connected to the drive pinion.

5. The method of claim 2 wherein the bearing is an output bearing that rotatably supports an output shaft that is configured to transmit torque from the torque source to another axle assembly.

6. The method of claim 1 wherein the differential assembly is rotatable about an axis and the wheel hub is coupled to the differential assembly when a level of lubricant in a lubricant reservoir that is disposed in the housing assembly above the axis and receives lubricant that is splashed by the ring gear is less than a threshold lubricant level.

7. The method of claim 6 wherein the wheel hub is subsequently decoupled from the differential assembly when the level of lubricant in the lubricant reservoir is not less than the threshold lubricant level.

8. The method of claim 1 wherein the wheel hub is coupled to the differential assembly when a threshold amount of time has elapsed since the ring gear received torque from the torque source.

9. The method of claim 8 wherein the wheel hub is coupled to the differential assembly for a predetermined period of time and is then decoupled from the differential assembly when the predetermined period of time has elapsed.

10. The method of claim 1 wherein the wheel hub is coupled to the differential assembly when a temperature of at least one bearing that is located inside the housing assembly exceeds a threshold temperature and a level of lubricant in a lubricant reservoir that is disposed in the housing assembly and receives lubricant that is splashed by the ring gear is less than a threshold lubricant level.

11. The method of claim 1 wherein lubricant that is splashed by the ring gear is received by a lubricant reservoir and lubricant is routed from the lubricant reservoir to at least one bearing.

12. The method of claim 11 wherein the lubricant is routed from the lubricant reservoir to an input bearing that rotatably supports an input shaft that is operatively connected to the drive pinion and to an output bearing that rotatably supports an output shaft that transmits torque from the torque source to a second axle assembly.

13. The method of claim 11 wherein the lubricant reservoir is disposed above the drive pinion.

14. The method of claim 13 wherein the lubricant reservoir is disposed above the ring gear.

15. The method of claim 11 wherein the lubricant reservoir is an output bearing lubricant reservoir that extends around an output bearing that rotatably supports an output shaft that transmits torque from the torque source to a second axle assembly, wherein lubricant that is splashed by the ring gear is received by the output bearing lubricant reservoir.

16. The method of claim 15 wherein the output bearing lubricant reservoir includes an annular body that defines a hole that receives the output bearing and a pan that extends from the annular body, wherein the pan is configured to receive lubricant.

17. The method of claim 16 wherein the pan is disposed under the output shaft and extends axially toward the differential assembly.

18. A method of controlling an axle assembly, comprising:
providing a differential assembly that is received in a housing assembly and has a ring gear that is selectively connectable to a torque source, wherein the differential assembly is selectively coupled to a first wheel hub and a second wheel hub that each support a vehicle wheel; and
coupling the first wheel hub and the second wheel hub to the differential assembly when the ring gear does not receive torque from the torque source such that torque from the first wheel hub rotates the ring gear and the ring gear splashes lubricant in the housing assembly.

19. The method of claim 18 wherein a first wheel end disconnect selectively couples the first wheel hub to the differential assembly and a second wheel end disconnect selectively couples the second wheel hub to the differential assembly.

20. The method of claim 19 wherein the first wheel end disconnect is disposed inside the first wheel hub and the second wheel end disconnect is disposed inside the second wheel hub.

* * * * *